United States Patent Office 3,687,619
Patented Aug. 29, 1972

3,687,619
METHOD OF PREPARING ZINC HYDROSULFITE
Virgil L. Hansley, Stuart Schott, and Louis F. Moormeier, Cincinnati, Ohio, assignors to National Distillers and Chemical Corporation, New York, N.Y.
No Drawing. Continuation-in-part of application Ser. No. 810,063, Jan. 15, 1969, which is a division of application Ser. No. 494,243, Oct. 8, 1965. This application Apr. 1, 1971, Ser. No. 130,522
Int. Cl. C01b *17/66*
U.S. Cl. 423—109
3 Claims

ABSTRACT OF THE DISCLOSURE

An improved method for the preparation of stable zinc hydrosulfite solutions wherein reactive zinc is treated with sulfur dioxide in an aqueous solution, the improvement utilizing reactive zinc in the form of a calcium-sodium-zinc alloy containing about 0.2 to 1.0% by weight of calcium, about 0.3 to 3.0% by weight of sodium, and from about 96 to 99.5% by weight of zinc.

---

This application is a continuation-in-part of Ser. No. 810,063, filed Jan. 15, 1969, now Pat. No. 3,574,126, which, in turn, is a division of application Ser. No. 494,243, filed Oct. 8, 1965, now U.S. Pat. No. 3,536,445.

This invention relates to novel zinc compositions and their preparation. More particularly, it relates to a calcium-sodium-zinc alloy, its uses, and its preparation.

The calcium-sodium-zinc alloys of this invention may be used generally in place of commercial zinc dust when a reaction calls for the use of zinc in a reactive form. It is especially useful in the preparation of stable zinc hydrosulfite solutions, which are important industrially as bleaching agents for groundwood, paper and pulp, and other cellulosic materials.

At the present time, zinc dust having a particle size of about 200 to 325 mesh, is used commercially when the reaction calls for the use of reactive zinc particles. The use of zinc dust, however, has several disadvantages. In the first place, zinc dust, obtained commercially by distilling virgin or by-product zinc, is relatively expensive. In addition, fire and explosion hazards are involved in the handling and reaction of zinc dusts. The use of zinc dust also requires a special reaction zone that can handle such finely-divided material.

It is also known that zinc hydrosulfite may be prepared by the reaction of sulfur dioxide with zinc amalgam in an aqueous medium and in the absence of alkali salts. The use of an amalgam has the disadvantage of requiring the handling of large amounts of mercury which must also be recovered for economic and safety reasons. U.S. Pat. No. 3,205,038 shows that the disadvantages involved in the use of zinc dust or zinc amalgam can be overcome by the use of a solid sodium-zinc alloy having a particle size of about ½ inch up to about 2 inches and a sodium content within the range of about 0.5 to 4.0 weight percent. Although the invention of said application overcame the disadvantages of the prior art and has broad commercial application, it could not be used effectively to prepare concentrated solutions of zinc hydrosulfite. Zinc hydrosulfite solutions of 20–30% concentration must be prepared for conversion to sodium hydrosulfite where crystalline processes are involved. The present invention, while over-coming the disadvantages of the prior art has the further advantage in that it can be employed to prepare stable zinc hydrosulfite solutions of relatively high concentrations. It is, of course, essential that stable solutions be obtained since the commercial applicability of zinc hydrosulfite solutions is predicted, in great part, on their stability.

It has also been found that the stable zinc hydrosulfite solutions of this invention can be converted by methods well-known to the art, to higher yields of sodium hydrosulfite. In addition the sodium hydrosulfite which is obtained has a high degree of purity.

It is, therefore, an object of this invention to provide a calcium-sodium-zinc alloy which can be utilized to prepare stable, concentrated solutions of zinc hydrosulfite.

Another object of this invention is to provide a reactive form of zinc which eliminates the hazards involved in employing zinc dust or zinc amalgam as a reactant.

A further object of this invention is to provide a method for producing stable zinc hydrosulfite solutions by reacting sulfur dioxide under conventional operating conditions with a calcium-sodium-zinc alloy admixed with a liquid hydrocarbon.

It is still a further object of this invention to provide high conversions of zinc hydrosulfite to sodium hydrosulfite which has a high stability using an alloy which is more economically prepared.

Other objects will become readily apparent from the ensuing description and illustrative embodiments of the invention.

It has now been found, in accordance with this invention, that more stable zinc hydrosulfite solutions can be prepared by reacting, in an aqueous solution, sulfur dioxide with a calcium-sodium-zinc alloy, the alloy containing about 0.2 to 1.0% by weight of calcium, about 0.3 to 3.0% by weight of sodium, and from about 96 to 99.5% by weight of zinc. The reaction is carried out at a temperature between about 5° and 60° C., preferably between about 20° and 40° C. The pH is usually maintained between about 3 and 8.

The calcium-sodium-zinc alloy may be prepared in any convenient manner known in the alloy preparation art. It can be formed, for example, by adding pure zinc metal in a suitable vessel, for example, gray cast iron or a graphite crucible, until molten and then rapidly adding calcium and sodium with stirring to about 700 to 1000° C., and preferably at about 800 to 900° C., and holding the temperature in this range until uniform composition is obtained. It is preferred to carry out the process under an inert gas, for example, in an atmosphere of helium, argon, neon or a mixture thereof. Another method of preparation of the alloy involves the electrolysis of the appropriate $CaCl_2$-NaCl mixture in contact with molten Zn as the cathode.

While the alloy is usually used in finely divided form, typically below 200 mesh, an advantage of the calcium-sodium-zinc alloy is that the particle size is not critical. One of the advantages of its use is that large chunks of the alloy may be used i.e. ½ inch or 1 inch chunks, with a solution of sulfur dioxide and water flowing through to form the desired zinc hydrosulfite.

The amount of sodium in the calcium-sodium-zinc alloy may vary but a sodium content of 0.3 to 3.0% by weight is preferred. The alloy is sufficiently brittle to permit easy grinding, while a substantially higher sodium content may result in a product which contains a malleable free sodium phase, and because of this, it can be ground only with difficulty. Also, an alloy composition having too high of a sodium content tends to react with oxygen and moisture in the air, resulting in an alkaline and moist material when in contact with moist air.

A particularly economical method of preparing the calcium-sodium-zinc alloy uses as the starting material, a byproduct sodium cell filter sludge having the following typical analysis:

|  | Percent by wt. |
|---|---|
| Calcium | 18–22 |
| Sodium | 60–65 |
| CaO | } 13–22 |
| $Na_2O$ | |
| Inerts | |

Broadly, however, impure mixtures containing from 9 to 25% calcium, 50 to 75% sodium and up to 25% inerts may be employed.

In general, the method of preparation comprises agitating a melt containing the zinc to be alloyed and the sodium-calcium or sodium filter sludge at a temperature within the range of about 800° to 900° C., preferably under an inert atmosphere. The order in which the ingredients are introduced into the alloying mixture is not critical. For example, all of the companents can be charged to the reaction vessel initially. It is also possible to add the zinc last to a molten mixture of sludge.

As the molten mixture is being stirred, calcium and sodium from the sludge dissolve in the zinc. The calcium-sodium-zinc alloy formed is separated from the inerts by conventional methods such as bottom tapping or by skimming and thus separating the metal alloy layer.

The amount of sodium sludge used in proportion to the zinc in forming the calcium-sodium-zinc alloy varies slightly with the composition of the sludge because of the difference in equivalent weights between the metals.

In accordance with the preferred method of this invention, the preparation of zinc hydrosulfite is carried out in the presence of an inert diluent or diluents to form an easily transported zinc-rich paste dispersion. Such materials, if used, should be inert both to the reactants and the products. An example of suitable diluents include liquid hydrocarbons having from 6 to 16 carbon atoms per molecule. The use of petroleum hydrocarbon fractions having from 10 to 12 carbons has been found to be particularly effective for this purpose. Mixtures of the various liquid hydrocarbons can, of course, also be utilized. Generally, the liquid hydrocarbons which are used have a boiling point of from about 160° to 250° C., preferably from about 190° to 220° C. Some specific examples of the liquid hydrocarbons which may be employed are kerosene, naphtha, alkylate, ligroin, mineral spirits, tetralin, decalin, high flash point gasolene and the like. The amount of diluent employed is not critical and may vary over a wide range. In general, however, the volume ratio of diluent to the zinc will range from about 0.5:1 to 8:1 and preferably about 1:1.

In accordance with another important feature of this invention, the calcium-sodium-zinc alloys paste can be admixed with a liquid hydrocarbon, such as those disclosed above, and added in the form of a suspension or hydrocarbon-damp powder to the reaction zone. The aforementioned admixture can be conveniently prepared by adding more of the liquid hydrocarbon during the comminution of the alloy. The alloy will generally settle quite rapidly in the absence of agitation and can be separated as a hydrocarbon-damp powder or paste, if desired. This dispersion may be stabilized against alloy separation by the addition of a surface-active agent such as aluminum stearate, zinc stearate, sodium stearate, various metal soaps, and the like. It has also been found that the addition of a surface-active agent in the amount of from about 1 to 8% based on the liquid hydrocarbon present will provide on shaking a stable gel structure in which the particles will remain suspended for long periods of time.

The preparation of zinc hydrosulfite may be effected in any suitable conventional reaction vessel adapted for carrying out such a reaction, such as static beds or slowly agitated beds, for example, a rotating drum reactor, and under conventional operative conditions.

The zinc hydrosulfite produced in accordance with this invention can be converted into sodium hydrosulfite by any convenient procedure. Most commonly, it is reacted with sodium hydroxide or sodium carbonate at about 0° to about 65° C. A desirable method of converting and recovering sodium hydrosulfite comprises circulating the calcium-sodium-zinc alloy in water with liquid $SO_2$ through a tubular cooler at 35° C. The zinc hydrosulfite, after filtration, is converted to sodium hydrosulfite with 25% caustic soda. Zinc hydroxide is filtered from the sodium hydrosulfite solution. The dihydrate of sodium hydrosulfite ($Na_2S_2O_4 \cdot 2H_2O$) is "salted" out with sodium chloride and alcohol. One-third to one-half of the mother liquor is decanted off and the remaining slurry is heated to 60° C., to dehydrate the sodium hydro-sulfite solids. The resulting crystals are separated by filtration, washed with alcohol and dried at 60° to 80° C., under vacuum. Commercially, the final overall yield is 64-72% based on $SO_2$.

This invention will be more fully understood by reference to the following illustrative embodiments.

EXAMPLE I

Preparation of alloy (A) A charge of 98 parts of pure zinc, 1.75 parts of metallic sodium and 0.25 part calcium metal was placed in a gray cast iron pot equipped with a steel top tightly fitted and of sufficient height so that the alloy could be prepared in an inert atmosphere. The pot was equipped with a stirred to effect good contact between sodium, calcium and zinc in the molten state. The closed charged vessel was purged of air argon prior to heating and maintained under argon blanket for the duration of the run. Temperature was raised to 850° C. and the contents allowed to melt. Then rapid stirring was maintained for 5-10 minutes. Then the furnace was tilted so that the content could form an ingot on the side of the vessel and allowed to cool under an atmosphere of argon before removal of the ingot.

(B) In a similar manner a charge of 98 parts of pure zinc, 2.5 parts of sodium cell filter sludge (analyzing 20% Ca; 60% Na; 20% oxides and inerts) was added to the vessel as in Example I and the vessel closed and blanketed argon. The vessel was raised in temperature to 850° C. and agitated for 5-10 minutes after which a settling time of 10-15 minutes was allowed to permit any insolubles from the sludge to rise to the surface. Then the pot was tilted gently on its side and allowed to cool. After cooling and removal of the ingot from the pot any surface impurities can be removed mechanically if desired. Ordinarily, this will not be necessary because of the small amount. The alloy is ready to be coarsely broken up into chunks ⅛–¼ inch in size or ground to 200 mesh for the preparation of zinc hydrosulfite.

EXAMPLE II

Preparation of zinc hydrosulfite

A calcium-sodium-zinc alloy composition prepared either as in Examples I and II, was ground to a particle size of about 200 mesh, and 4.0 gram atoms of the ground alloy composition was reacted with 4.11 moles of sulfur dioxide in 1200 parts of air-free water at 45 to 50° C. for 54 minutes at a pH of 4.7 to 5.3. Titration of the resulting filtered zinc hydrosulfite solution showed 340 parts of zinc hydrosulfite corresponding to a yield of about 97% based on the zinc or about 89% based on the sulfur dioxide.

Stable zinc hydrosulfite solutions of relatively high concentrations can be effectively prepared utilizing the calcium-sodium zinc alloys of this invention. Moreover, higher yields and more pure sodium hydrosulfite can be obtained when the zinc hydrosulfite is prepared from the present calcium-sodium-zinc alloys.

While particular embodiments of this invention are shown above, it will be understood that the invention is obviously subject to variations and modifications without departing from its broader aspects.

What is claimed is:

1. In a method for the preparation of stable zinc hydrosulfite solutions which comprises reacting reactive zinc with sulfur dioxide at a temperature between about 5° and 60° C., the improvement which comprises using reactive zinc in the form of a calcium-sodium-zinc alloy containing about 0.2 to 1.0 percent by weight of calcium, about 0.3 to 3.0 percent by weight of sodium and from about 96 to 99.5 percent by weight of zinc.

2. The method of claim 1 in which the calcium-sodium-zinc alloy is prepared by alloying zinc with a sodium cell filter sludge.

3. The method of claim 2 in which the zinc is alloyed with the sodium cell filter sludge at a temperature in the range of 800° to 900° C. in an inert atmosphere.

References Cited
UNITED STATES PATENTS

| | | | |
|---|---|---|---|
| 3,205,038 | 9/1965 | Hansley et al. | 23—116 |
| 3,216,791 | 11/1965 | Hansley et al. | 23—116 |
| 3,536,445 | 10/1970 | Hansley et al. | 23—116 |
| 3,574,126 | 4/1971 | Hansley et al. | 23—116 X |

EARL C. THOMAS, Primary Examiner

U.S. Cl. X.R.

75—178 R